United States Patent [19]

Hirahata et al.

[11] Patent Number: 5,311,216
[45] Date of Patent: May 10, 1994

[54] EXPOSURE DEVICE HAVING MEANS FOR CORRECTING INTENSITY OF LASER BEAM DEPENDENT ON VARIATION IN ROTATIONAL SPEED OF PHOTOSENSITIVE MEMBER

[75] Inventors: Shinichi Hirahata, Kakamigahara; Tsuyoshi Ohashi, Hashima, both of Japan

[73] Assignee: Brother Kogyo Kabushiki Kaisha, Nagoya, Japan

[21] Appl. No.: 772,788

[22] Filed: Oct. 8, 1991

[30] Foreign Application Priority Data

Oct. 8, 1990 [JP] Japan .................................. 2-271522
Feb. 19, 1991 [JP] Japan .................................. 3-024515

[51] Int. Cl.⁵ .............................................. H04N 1/21
[52] U.S. Cl. .................................................. 346/108
[58] Field of Search ................ 346/108, 76 L, 160; 358/298, 296, 300, 302

[56] References Cited

U.S. PATENT DOCUMENTS 4,698,649 10/1987 Lee ........................................ 346/108
4,835,545 5/1989 Mager et al. ...................... 346/108
5,142,304 8/1992 Sato et al. ........................... 346/108

*Primary Examiner*—Mark J. Reinhart
*Attorney, Agent, or Firm*—Oliff & Berridge

[57] ABSTRACT

In an image recording apparatus including a rotary drum on which a photosensitive sheet is wound, the drum is rotated by a motor through a speed reduction gear assembly to rotate at a constant speed V. To maintain an average exposure amount applied to the photosensitive sheet at constant as it is not the case when the rotational or peripheral speed of the drum vary due to a backlash of the speed reduction gears or a load imposed on the drum, a speed detector is attached to the shaft of the drum to detect the rotational speed of the drum. Based on the detected rotational speed, the exposure amount is increased or decreased by $\Delta V/V$ times as much as the average exposure amount where V is a regular rotational speed of the drum and $\Delta V$ is a variation in the drum speed from the speed V.

15 Claims, 15 Drawing Sheets

| $1 \pm \Delta V/V$ | Wd \ Vd | 0 | 1 | 2 | ... | FE | FF |
|---|---|---|---|---|---|---|---|
| 1.992 | FF | 0 | FF | 1FE | ... | FD02 | FE01 |
| 1.984 | FE | 0 | FE | 1FC | ... | FC04 | FD02 |
| 1.977 | FD | 0 | FD | 1FA | ... | FB06 | FC03 |
| 1.969 | FC | 0 | FC | 1F8 | ... | | |
| ... | ... | | | | | | |
| 1.000 | 80 | 0 | 80 | 100 | ... | 7F00 | 7F80 |
| ... | ... | | | | | | |
| 0.016 | 2 | 0 | 2 | 4 | ... | 1FC | 1FE |
| 0.008 | 1 | 0 | 1 | 2 | ... | FE | FF |
| 0 | 0 | 0 | 0 | 0 | ... | 0 | 0 |

FIG. 7

EXPOSURE DEVICE HAVING MEANS FOR CORRECTING INTENSITY OF LASER BEAM DEPENDENT ON VARIATION IN ROTATIONAL SPEED OF PHOTOSENSITIVE MEMBER

BACKGROUND OF THE INVENTION

The present invention relates generally to an image recording apparatus for recording an image on a photosensitive member. More particularly, the invention relates to an exposure device wherein the photosensitive member receives a constant amount of exposure despite there is a variation in a moving speed of the photosensitive member.

Heretofore, there has been known an image recording apparatus having an arrangement shown in FIG. 1. A drum 2 is rotatably supported on a frame (not shown) to be rotatable in the counter-clockwise direction as indicated by an arrow. A photosensitive sheet 1 is wound around the peripheral surface of the drum 2. A charging station 3, a laser scanner 4, a developing station 5 and a discharging station 6 are disposed around the periphery of the drum 2.

In operation, the photosensitive sheet 1 is supplied onto the drum 2 from a sheet supply unit (not shown) and is held on the peripheral surface of the drum 2 by means of a suction unit (not shown). The photosensitive sheet 1 placed on the drum 2 is uniformly charged in the charging station 3. A laser beam emitted in accordance with image data is scanned by the laser scanner 4 and is applied onto the photosensitive sheet 1. Thus, the photosensitive sheet 1 is exposed to the laser beam and a latent image is formed thereon. The latent image is developed in the developing station 5, thereby forming a visible image on the photosensitive sheet 1.

As shown in FIG. 2, the drum 2 is rotated by a motor 7 via speed reduction gears 8a, 8b. An encoder 9 is provided in the rotary shaft of the motor 7 to detect a rotational speed of the motor 7. The data regarding the rotational speed of the motor 7 are fed back to a motor drive controller 10 so that the motor 7 is rotated at a constant speed.

However, notwithstanding the fact that the motor 7 rotates at a constant speed, the actual rotational speed of the drum 2 varies in the range of several to several tens hertz due to the backlash of the gears 8a, 8b and/or the variation in the load imposed on the drum 2. Therefore, the auxiliary scanning pitch in the circumferential direction of the drum 2 changes depending on the drum speed variation, whereby an amount of exposure per a unit area on the photosensitive sheet 1 changes depending on the drum speed variation. The amount of exposure is defined by a product of the laser beam intensity and an exposure time. For a prescribed peripheral speed V (m/sec) of the drum 2 with a variation $\Delta V$, the exposure time T (sec) at which a point on the photosensitive sheet 1 is exposed to the laser beam is expressed by:

$$T = T_0 \cdot V/(V + \Delta V)$$

where $T_0$ represents the exposure time when there is no variation in the drum speed.

For the laser beam intensity P(watt), the exposure amount E is given by:

$$\begin{aligned} E &= P \cdot T \\ &= P \cdot T_0 \cdot V/(V + \Delta V) \end{aligned}$$

To summarize, even if it is intended to uniformly expose the entire surface of the photosensitive sheet 1 to the laser beam, the amount of exposure changes depending on the rotational position of the drum 2 due to the drum speed variation. When the drum 2 is instantaneously at a speed higher than the prescribed regular speed, the auxiliary scanning pitch is widened and thus the exposure amount is reduced. On the other hand, when the peripheral speed of the drum 2 is subsequently lowered, the exposure amount is increased. Therefore, the visible image obtained by developing the latent image is not uniform in density. As such, there is a problem in the conventional image recording apparatus such that the image quality is greatly degraded.

SUMMARY OF THE INVENTION

The present invention has been made to solve the aforementioned problems, and accordingly it is an object of the present invention to provide an exposure device in which a constant amount of exposure is applied onto a minimum unit area on a photosensitive member upon correcting the intensity of a laser beam dependent on the variation in the moving speed of the photosensitive member, whereby a high quality output image is obtained which is free from density variation.

Another object of the present invention is to provide such an exposure device at reduced cost.

In accordance with one aspect of the present invention, there is provided an exposure device for forming a latent image on a photosensitive recording member, which comprises (a) image data generating means for generating image data having a level, (b) moving means for moving the recording member at a regular speed, the speed at which the recording member is moved being liable to vary from the regular speed, (c) speed variation detecting means for detecting a variation of the speed at which the recording member is moved, and for producing speed variation data having a level indicative of the variation in the speed of the recording member, (d) semiconductor laser for emitting a laser beam onto the recording member in accordance with the image data, an intensity of the laser beam being variable dependent on the level of the image data, and (e) correction means for correcting the intensity of the laser beam in accordance with the speed variation data.

The speed variation detecting means comprises speed detecting means for detecting the moving speed of the recording member and outputting data indicative of the detected moving speed of the recording member, and operation means for dividing the data outputted from the speed detecting means with a predetermined value corresponding to the regular speed, thereby giving the speed variation data.

In accordance with another aspect of the present invention, there is provided an exposure device for forming a latent image on a photosensitive recording member, which comprises (a) image data generating means for generating image data having a level, (b) semiconductor laser for emitting a laser beam onto the recording member, the semiconductor laser emitting the laser beam when a current supplied thereto has a level higher than a threshold value, (c) first current supplying means for supplying a first current corresponding to the level of the image data to the semiconductor laser, (d) second current supplying means for supplying a second current whose level is slightly higher than the threshold value to the semiconductor laser, (e) addition means for adding a predetermined value to the image data and producing added data, (f) moving means for moving the recording member at a regular speed, the speed at which the recording member is moved being liable to vary from the regular speed, (g) speed variation detecting means for detecting a variation of the speed at which the recording member is moved, and for producing speed variation data having a level indicative of the variation in the speed of the recording member relative to the regular speed, (h) multiplying means for multiplying the added data and the speed variation data and producing multiplied data, and (i) correction means for applying a current to the semiconductor laser to correct the intensity of the laser beam in accordance with the multiplied data.

In operation, the predetermined value is added to the image data by the addition means. On the other hand, the speed variation ($\pm \Delta V$) of the moving photosensitive recording member is detected by the speed variation detecting means. The output of the addition means and the speed variation data indicative of $\pm \Delta V$ are multiplied by the multiplying means. In accordance with the output from the multiplying means, the correction means supplies the current to the semiconductor laser, whereby the intensity of the laser beam is corrected depending on the variation in the speed of the photosensitive member.

In accordance with still another aspect of the invention, there is provided an exposure device for forming a latent image on a photosensitive recording member, which comprises (a) image data generating means for generating image data having a level, (b) semiconductor laser for emitting a laser beam onto the recording member, (c) moving means for moving the recording member at a regular speed, the speed at which the recording member is moved being liable to vary from the regular speed, (d) speed variation detecting means for detecting a variation of the speed at which the recording member is moved, and for producing speed variation data having a level indicative of the variation in the speed of the recording member, (e) offset means for adding a predetermined offset value to the speed variation data and producing added data, (f) first multiplying means for multiplying the added data and the image data and producing a first multiplied data, the first multiplied data being one of positive and negative in polarity, (g) second multiplying means for multiplying a value obtained by reducing the offset value from one and the image data and producing a second multiplied data, and (h) applying means for applying the first multiplied data and the second multiplied data to the semiconductor laser.

The above and other objects, features and advantages of the present invention will become more apparent from the following description when taken in conjunction with the accompanying drawings in which preferred embodiments of the present invention are shown by way of illustrative examples.

BRIEF DESCRIPTION OF THE DRAWINGS

FIG. 7 shows contents of a look-up table contained in a correction memory shown in FIG. 6;

DETAILED DESCRIPTION OF THE PREFERRED EMBODIMENTS

Figure 1:
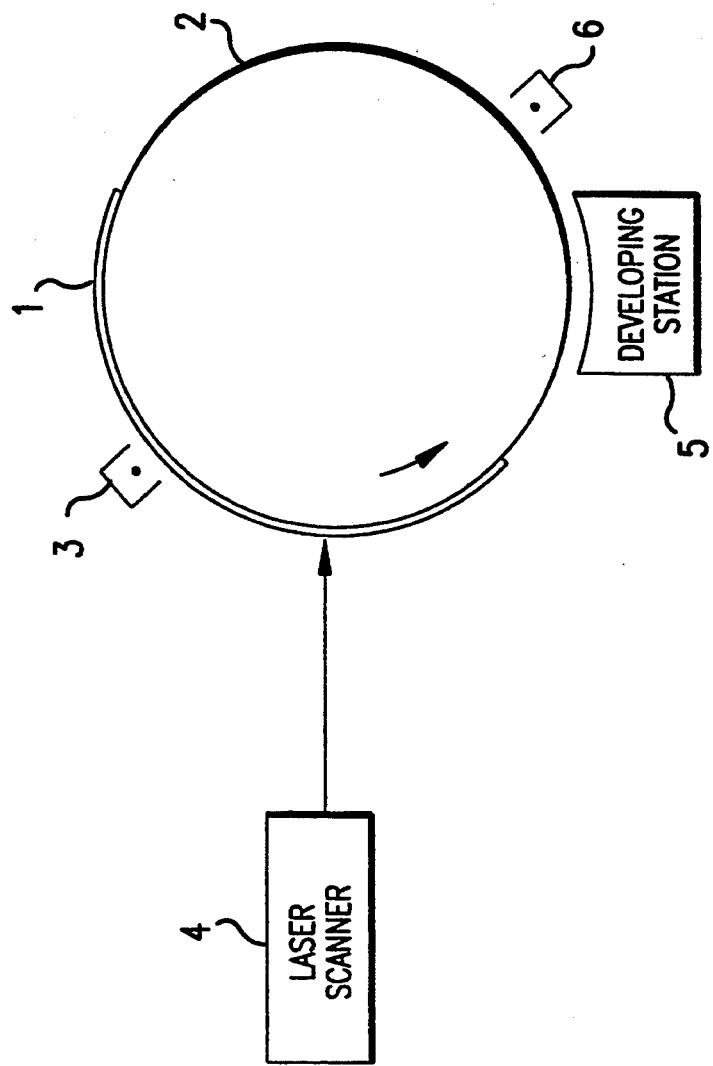
FIG. 1 is a vertical cross-sectional view showing an essential portion of a conventional image recording apparatus.
Figure 2:
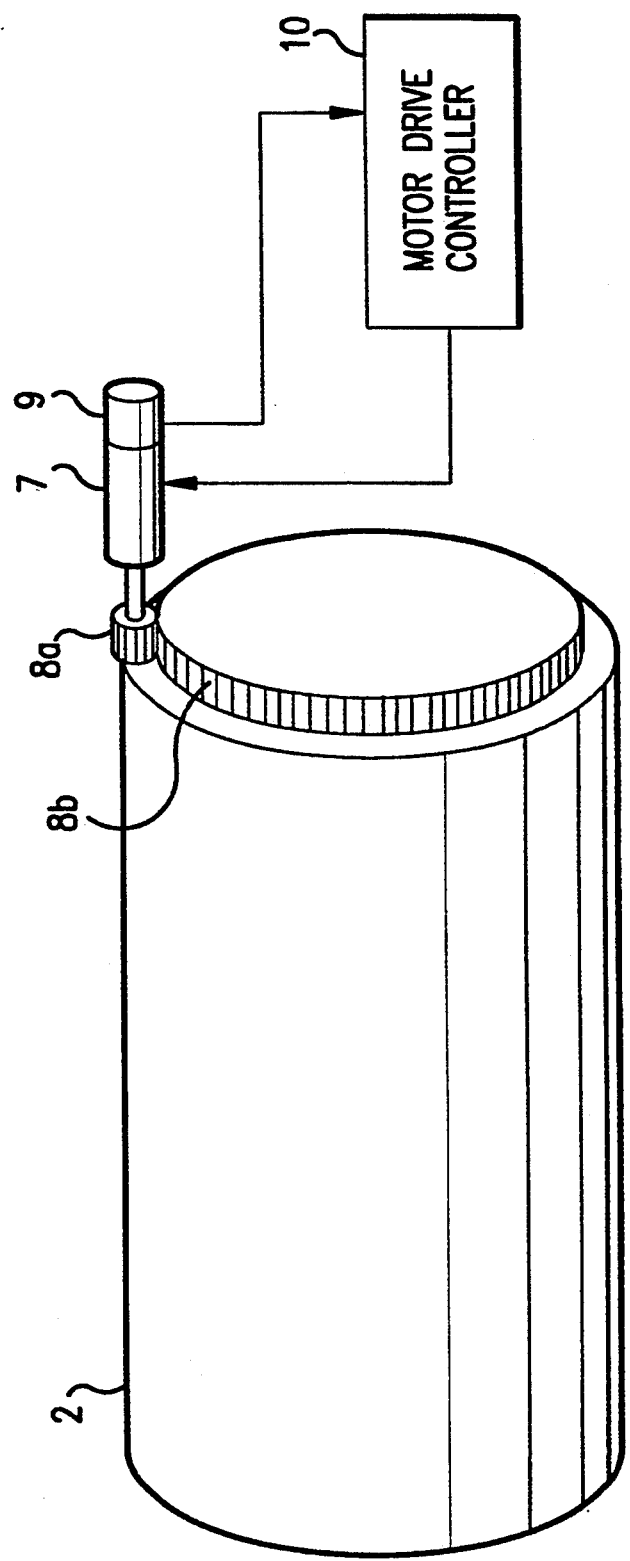
FIG. 2 is a perspective view showing a drum and a speed reduction gear assembly incorporated in the image recording apparatus shown in FIG. 1.
Figure 3:
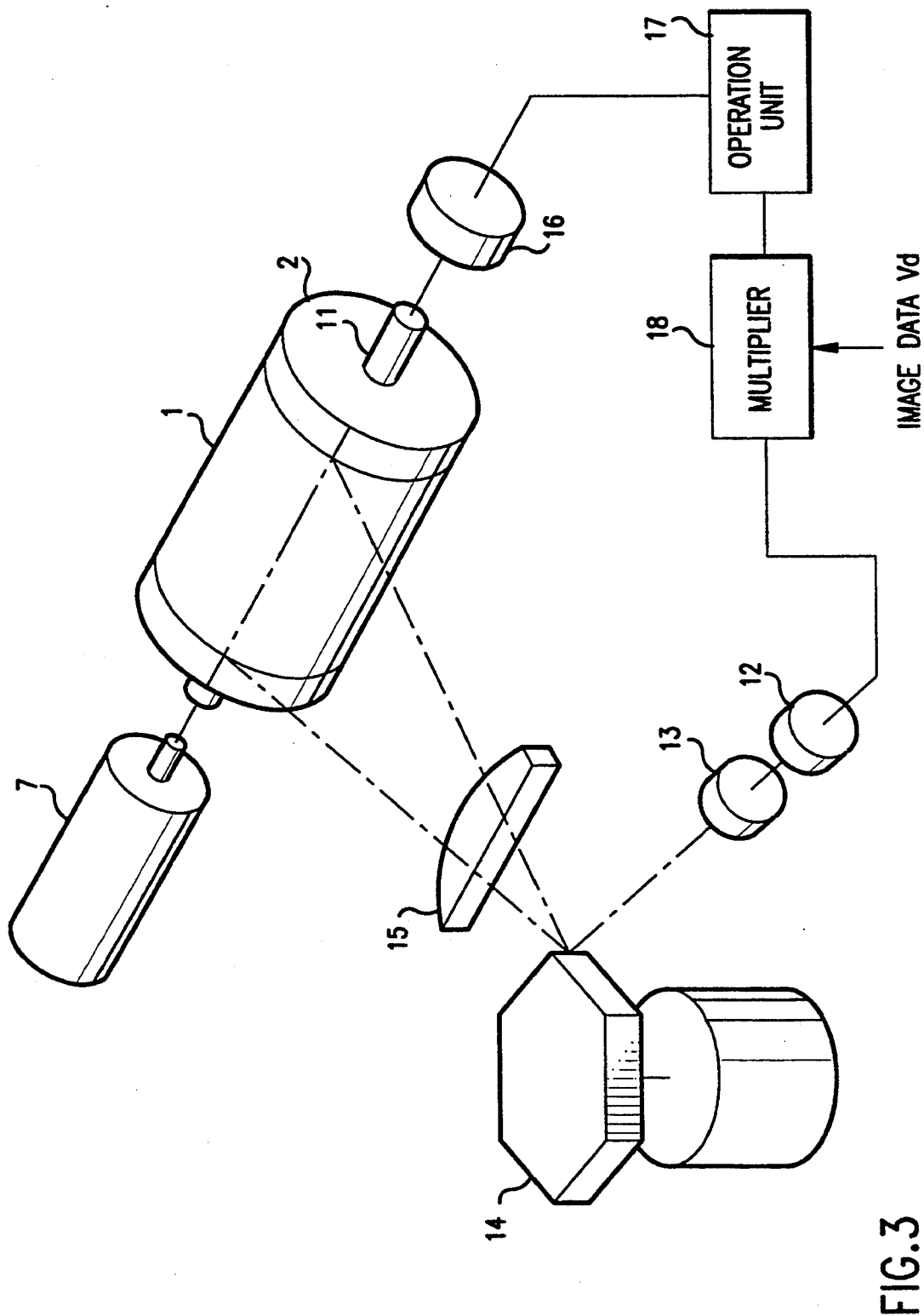
FIG. 3 is a perspective view showing an arrangement of an exposure device incorporating an exposure amount correcting device depicted in block form according to a first embodiment of the present invention.
Figure 4:
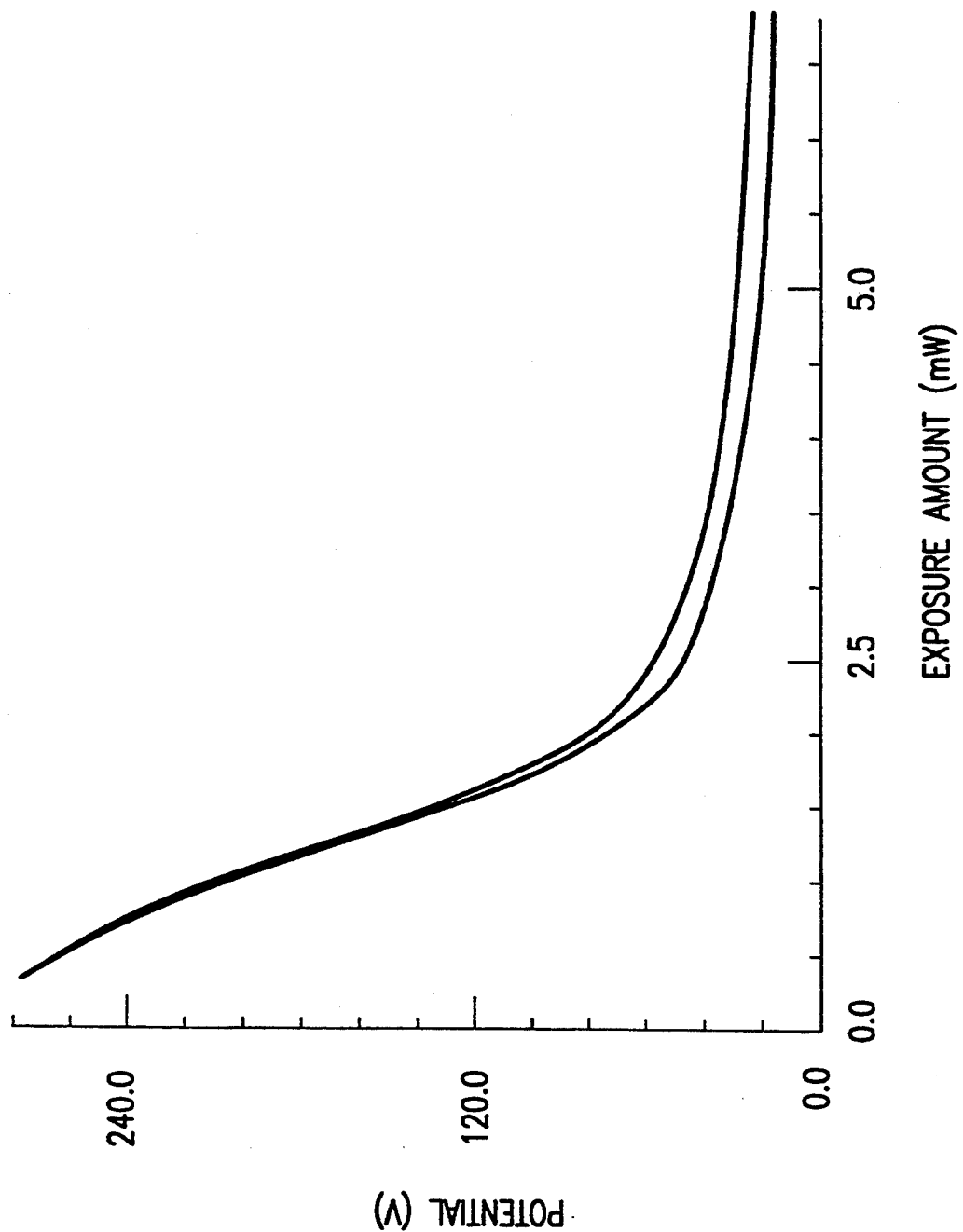
FIG. 4 is a graphical representation showing a characteristic of a photosensitive member used in the present invention.
Figure 5:
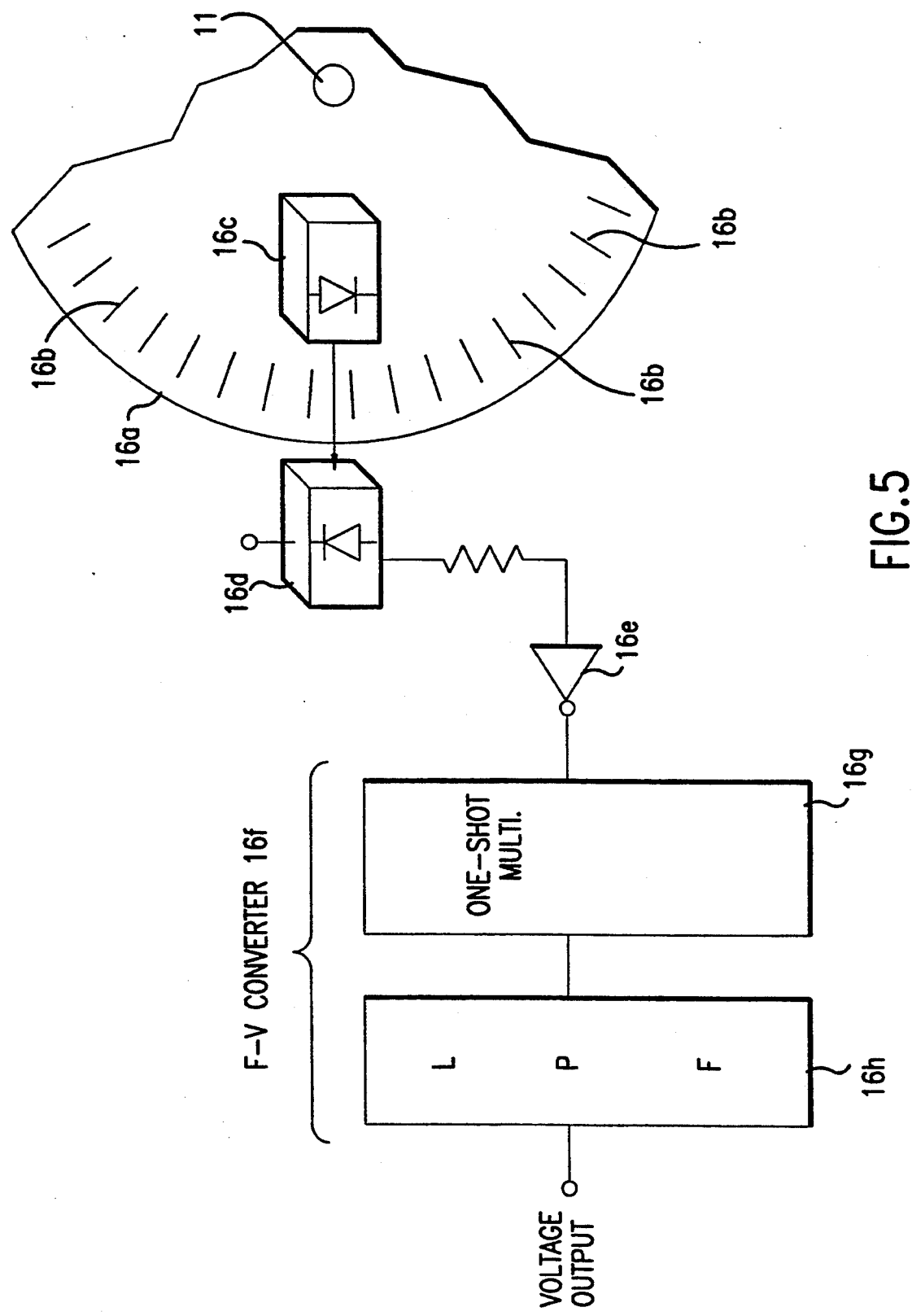
FIG. 5 shows an arrangement of a speed detector used in the exposure amount correcting device shown in FIG. 3.

Referring to FIGS. 3 through 5, a first embodiment of the present invention will be described.

In FIG. 3, a motor 7 is coupled to a shaft 11 of a drum 2 via a speed reduction gear assembly (not shown). A sheet-like photosensitive member 1 is wound around the periphery of the drum 2. A laser beam emitted from a semiconductor laser 12 is applied onto a multi-faced polygon mirror 14 through a collimator lens 13. The laser beam is horizontally deflected in accordance with the rotation of the polygon mirror 14 to scan the photosensitive sheet 1 through an F-$\theta$ lens 15.

The photosensitive sheet 1 is made of titanium oxide ($TiO_2$), zinc oxide (ZnO) or the like. A characteristic of the zinc oxide made photosensitive sheet is shown in FIG. 4. As shown, an electrostatic potential on the surface of the photosensitive sheet reduces gradually as the amount of exposure increases. The titanium oxide made photosensitive sheet represents the similar characteristic. Since a photosensitive sheet 1 having such a characteristic is used in the present invention, the variation in density of the visible image results from the variation in the rotational speed of the drum 2.

Referring back to FIG. 3, a speed detector 16 is attached to the drum shaft 11 to detect the rotational speed of the drum 2. Detailed arrangement of the speed detector of is shown in FIG. 5. As shown therein, the speed detector 16 includes a photo-coupler consisting of a rotary disk 16a, a light emitting diode 16c, and a light receiving diode 16d. The rotary disk 16a is coaxially fixedly attached to the drum shaft 11 to be rotatable therewith. A plurality of radially extending slits 16b are circumferentially formed on the rotary disk 16 at equal intervals. The light emitting diode 16c and the light receiving diode 16d are disposed in confronting relation to each other with the disk 16a intervened therebetween so that the light emitted from the light emitting diode 16c is intermittently received at the light receiving diode 16d through the slits 16a when the disk 16a is rotating. The light receiving diode 16d produces a pulse signal corresponding to the rotational speed of the drum 2. The pulse signal is applied through an amplifier 16e to a frequency-to-voltage converting circuit (hereinafter referred to "F-V converter) 16f made up of a one-shot multivibrator 16g and a low-pass filter or an integration circuit 16h. With the F-V converter 16f, the pulse signal is converted to a voltage which can be represented by $V \pm \Delta V$ where $\Delta V$ is a variation in the rotational speed of the drum 2 with respect to the prescribed regular rotational speed V of the drum 2. The speed detector 16 as illustrated is capable of detecting the rotational speed of the drum 2 at high accuracy to such an extent that it produces two thousands to ten thousands pulses per one rotation of the drum 2.

Referring again back to FIG. 3, an operation circuit 17 is connected to the output of the speed detector 16, and a multiplier 18 is in turn connected to the output of the operation circuit 17. The operation circuit 17 is supplied with the voltage $(V \pm \Delta V)$ outputted from the F-V converter 16f of the speed detector 16. In the operation circuit 17, the voltage $(V \pm \Delta V)$ is divided by V to produce $(1 \pm \Delta V/V)$. The multiplier 18 multiplies the voltage $(1 \pm \Delta V/V)$ and image data d supplied thereto to produce $d \cdot (1 \pm \Delta V/V)$. A commercially available IC chip, such as DAC-08 supplied from Analog Devices or MB86030 supplied from Fujitsu Limited, can be used in the multiplier 18.

The output of the multiplier 18 is connected to the semiconductor laser 12 which emits a laser beam whose intensity is in proportion to the level of the image data supplied thereto. Therefore, in response to the output of the multiplier 18, the semiconductor laser 12 emits a laser beam whose intensity P (watt) is represented by the following equation:

$$P = K \cdot d(1 \pm \Delta V/V) \quad (1)$$

where K is a predetermined constant. Note that the area of the laser beam spot irradiated onto the photosensitive sheet 1 is the same size as the size of a picture element on the photosensitive sheet 1.

When the laser beam having an intensity P is irradiated onto a precharged photosensitive sheet 1, a latent image is formed thereon. An average exposure amount E is represented by a product of the intensity of the laser beam and an exposure time. Since the frequency of variation in the rotational speed of the drum 2 is sufficiently low when compared with the frequency at which the polygon mirror 14 scans the laser beam, the average exposure amount can be represented by the following equation:

$$E = \frac{K \cdot d(1 \pm \Delta V/V)}{S} \cdot \frac{K_2 \cdot S}{L \cdot (V \pm \Delta V)} = \quad (2)$$

$$\frac{K \cdot K_2 \cdot d}{V \cdot L} \text{ (joule/}m^2\text{)}$$

where $K_2$ is a value obtained by dividing an exposure time for an effective scanning area with an exposure time for an entire scanning region. Specifically, $K_2$ is a constant representing an effective scanning rate for scanning the photosensitive sheet 1 having a width L (meter).

As can be appreciated from equation (2), even if the rotational speed of the drum 2, i.e., the speed in the auxiliary scanning direction, varies by $\Delta V$ from the speed V, the average exposure amount E is not affected by the speed variation $\pm \Delta V$ of the drum 2, provided that the exposure amount is increased or decreased by $\Delta V/V$ times as much as the average exposure amount.

With the exposure thus performed, a latent image is formed on the photosensitive sheet 1. The latent image is then developed in a developing station (not shown) and the visible image formed on the photosensitive sheet 1 is discharged out of the image recording apparatus.

Referring to FIGS. 6 through 9, a second embodiment of the present invention will be described. An arrangement of the second embodiment is similar to that of the first embodiment except the multiplier 18 used in the first embodiment.

In the second embodiment, the output of the F-V converter 16f in the speed detector 16 is connected to the operation unit 17 which in turn is connected through an analog-to-digital converter (hereinafter referred to as "A-D converter") 19 to a correction memory 20. As described previously, the operation unit 17 divides the voltage $(V \pm \Delta V)$ outputted from the F-V converter 16f with V to produce $(1 \pm \Delta V/V)$. The A-D converter 19 converts the signal from the operation unit 17 to an 8-bit digital signal Wd and applies the latter to the correction memory 20.

The correction memory 20 includes a read-only memory (ROM) 20a in which stored is a look-up table as shown in FIG. 7. In the look-up table, 16-bit data are stored with 16-bit address data. The 16-bit address data are divided into two groups AH and AL. The image data Vd supplied from an image data generating unit (not shown) are applied to the first 8-bit address group AH whereas the 8-bit digital signal Wd outputted from the A/D converter 19 is applied to the second 8-bit address group AL. The multiplied data of the image data Vd and the signal Wd are stored in the look-up table. Specifically, in response to the image signal Vd applied to the first address group and the signal Wd applied to the second address group, the multiplied data Va of the signals Vd and Wd are read out of the ROM 20a as corrected image data, i.e., $$Va = Vd \times Wd \quad (3)$$

To the output side of the correction memory 20, a semiconductor laser driver circuit 22 is connected through a digital-to-analog converter (hereinafter referred to as "D-A converter") 21. The D-A converter 21 converts the corrected image data Va in the form of 8-bit digital signal to an analog signal which in turn is supplied to the driver circuit 22.

Figure 8:
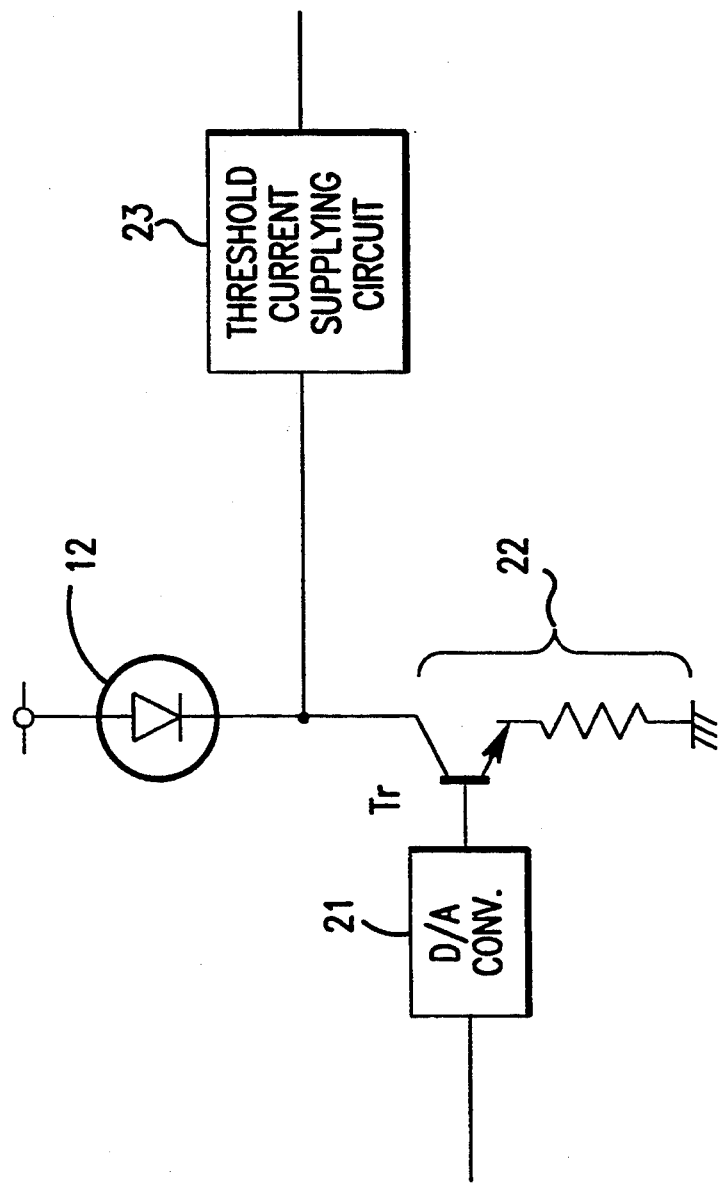
FIG. 8 is a diagram showing a semiconductor laser driving circuit.

The driver circuit 22 is configured as shown in FIG. 8. The output of the D-A converter 21 is connected to the base of a transistor Tr which is connected in series to the semiconductor laser 12. When the analog signal corresponding to the corrected image data Va is applied to the base of the transistor Tr, the transistor Tr is rendered conductive, whereby a driving current in proportion to the corrected image data Va is flowed in the semiconductor laser 12. To the semiconductor laser driver circuit 22, a threshold current control circuit 23 is further connected which supplies a threshold current of the semiconductor laser 12 to the driver circuit 22.

Figure 9:
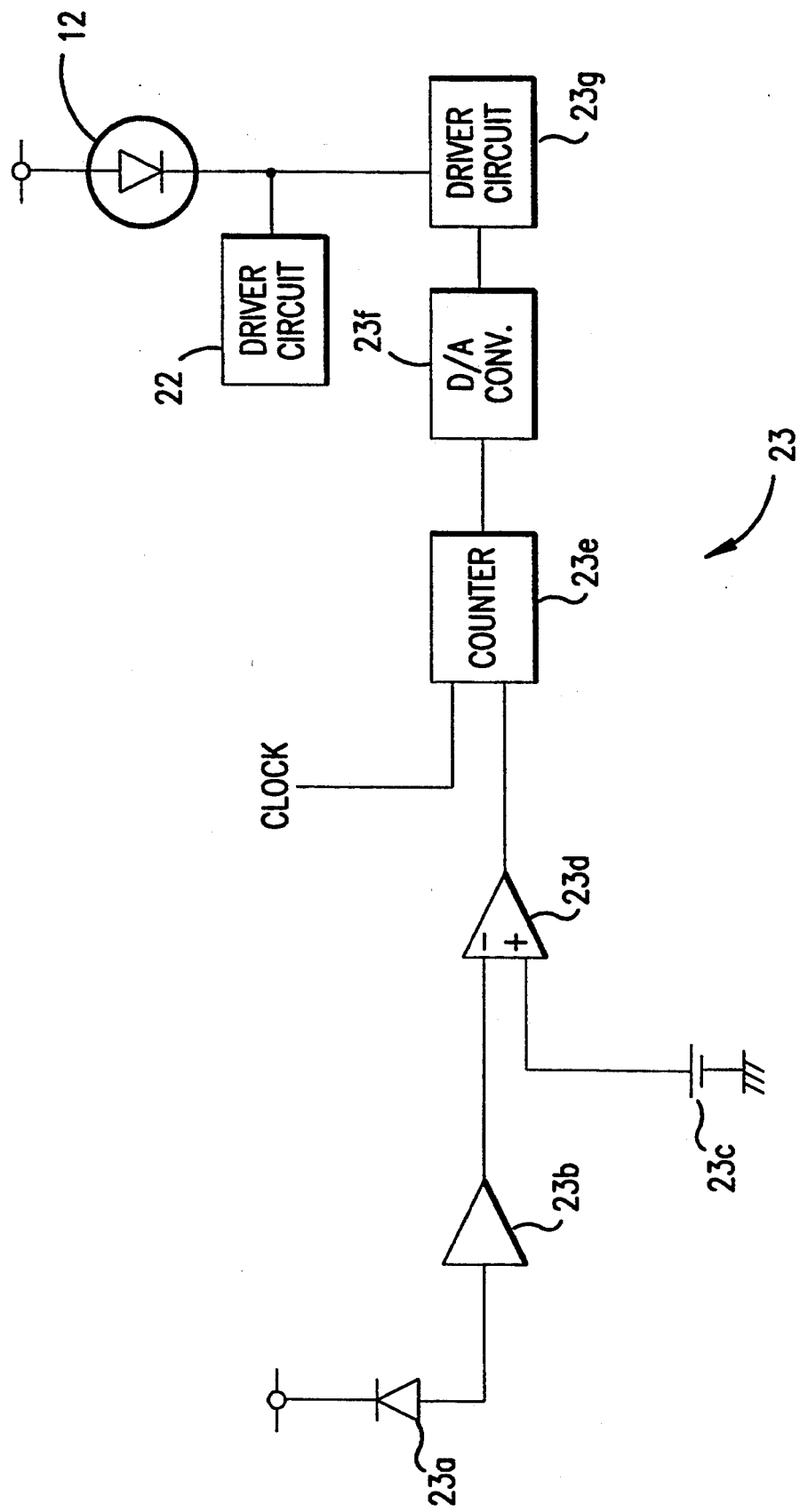
FIG. 9 is a block diagram showing a threshold current supplying circuit.

As shown in FIG. 9, the threshold current control circuit 23 includes a photodiode 23a which is incorporated in the package in which the semiconductor laser 12 is contained. The photodiode 23a is used for a monitoring the laser beam emitted from the semiconductor laser 12. An optical current outputted from the photodiode 23a is amplified by an amplifier 23b, and the resulting signal is compared with a reference voltage 23c in a comparator 23d. Depending on the comparison results, the count number in a counter 23e is incremented or decremented. The count number in the counter 23e is then converted to an analog signal in a D-A converter 23f. The driver circuit 23g supplies a current to the semiconductor laser 12 in response to the analog signal.

As is well known in the art, the threshold current of the semiconductor laser 12 changes depending on the temperature. The threshold current control circuit 23 serves to control the driving current to be applied to the semiconductor laser 12 so that the intensity of the laser beam is in proportion to the level of the image data regardless of the change of the temperature. To the semiconductor laser 12, a sum of the currents from the semiconductor laser driver circuit 22 and the driver circuit 23g is applied. The above-described control operation is performed in response to a control signal every time when one line scanning by the polygon mirror 14 has been terminated. At this time, only the threshold current control circuit 23 is driven but the driver circuit 22 is not operated. Stated differently, the control operation is performed so as not to prevent the exposure operation to be performed in response to the input image data.

Operation of the second embodiment will be described.

For the rotational or peripheral speed of the drum 1 fluctuated from a regular speed, the speed detector 16 outputs a voltage $V\pm\Delta V$ where V corresponds to the regular speed and $\Delta V$ corresponds to a variation of the rotational speed. The operation unit 17 provides a speed variation rate $1\pm\Delta V/V$ upon dividing $V\pm\Delta V$ with V. The A-D converter 19 outputs the 8-bit digital signal Wd to the correction memory 20 in response to the speed variation rate $1\pm\Delta V/V$. The signal Wd is applied to the second address group AL of the ROM 20a. On the other hand, the 8-bit image data Vd are applied to the second address group AH. Given the addresses of the first and second address groups AH and AL, the data Va which are a product of the address Vd in the first address group AH and the address Wd in the second address group AL are read out of the correction memory 20. That is, $$Va = Vd \times (1 \pm \Delta V/V) \quad (4)$$

The data Va are applied to the semiconductor laser driver circuit 22 through the D-A converter 21, whereby a laser beam whose intensity Pa is in proportion to the data Va is emitted from the semiconductor laser 12. The intensity Pa of the laser beam can be expressed by the following equation:

$$Pa = k \times \eta \times Va = k \times \eta \times Vd \times (1 \pm \Delta V/V) \quad (5)$$

where $\eta$ is a current-to-light intensity conversion efficiency (quantity differential efficiency) of the semiconductor laser 12, and k is a signal-to-current conversion efficiency of the driver circuit 22.

The photosensitive sheet 1 is exposed to the laser beam having the intensity Pa. The exposure time T at which each picture element is exposed is expressed by the following equation:

$$T = \frac{S}{(V \pm \Delta V) \times L} \quad (6)$$

where L is a scanning width of the laser beam on the photosensitive sheet 1, and S is a spot area of the laser beam irradiated onto the photosensitive sheet 1. As mentioned previously, the beam spot area is assumed to be in coincidence with the size of the picture element.

The exposure amount on each picture element S is defined by a product of the light intensity P of the laser beam and the exposure time T. Therefore, the following equation is established:

$$E = \frac{k \times \eta \times Vd \times (1 \pm \Delta V/V) \times S}{(V \pm \Delta V) \times L} = \frac{k \times \eta \times Vd \times S}{V \times L} \quad (7)$$

As can be appreciated from equation (7), the exposure amount E on each picture element S is not affected by the speed variation. Therefore, despite speed variation in the drum 2, the exposure amount applied to the photosensitive sheet 1 is corrected depending on the speed variation.

A third embodiment of the present invention will next be described with reference to FIGS. 10 and 11.

The third embodiment is based on the fact that the same pattern of the speed variation of the drum 2 repeatedly appears during each rotation of the drum 2. This is due to the fact that the same teeth of the speed reduction gears 8a, 8b are brought into meshing engagement with each other during the continuous driving of the drum 2 and substantially the same load is imposed on the drum 2 at the fixed circumferential position in which the developing station is located.

Figure 10:
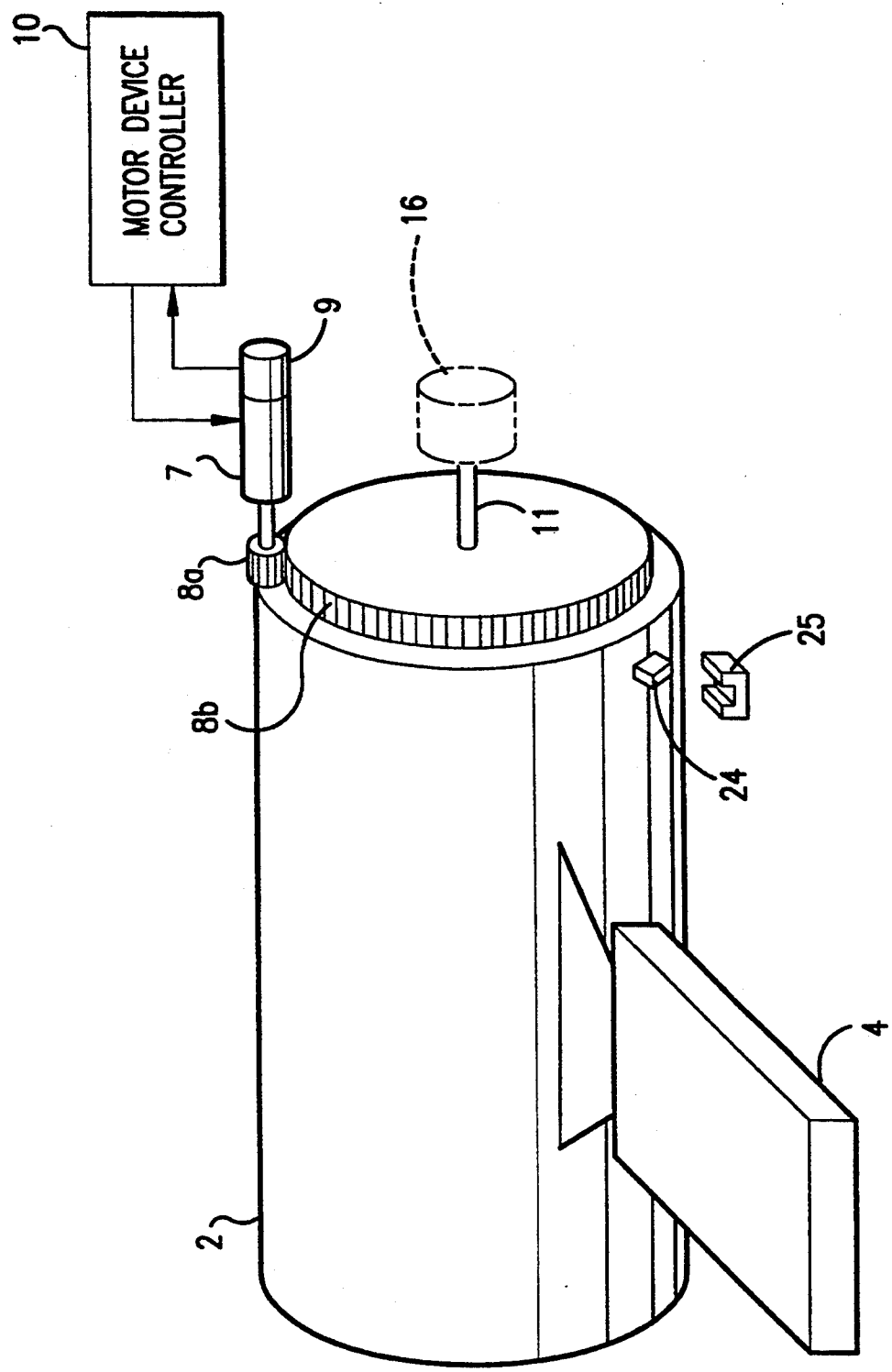
FIG. 10 is a perspective view showing an arrangement of the exposure device according to a third embodiment of the present invention.

Referring to FIG. 10, the speed detector 16 is detachably attached to the shaft 11 of the drum 2. In this embodiment, the speed detector 16 is used only in the initial setting stage to trace the speed variation of the drum 2. Once the speed variation of the drum 2 has been traced, the speed detector 16 is detached from the drum shaft 11 and the exposure device is used without the speed detector 16. Therefore, the exposure device according to the third embodiment is advantageous in terms of cost.

As shown in FIG. 10, an origin indicative plate 24 is attached to the axial end position on the periphery of the drum 2, and a photo-interrupter 25 is attached to a frame (not shown). The pass-by of the plate 24 is detected by the photo-interrupter 25 and a detection signal is produced from the photo-interrupter 25.

Figure 11:
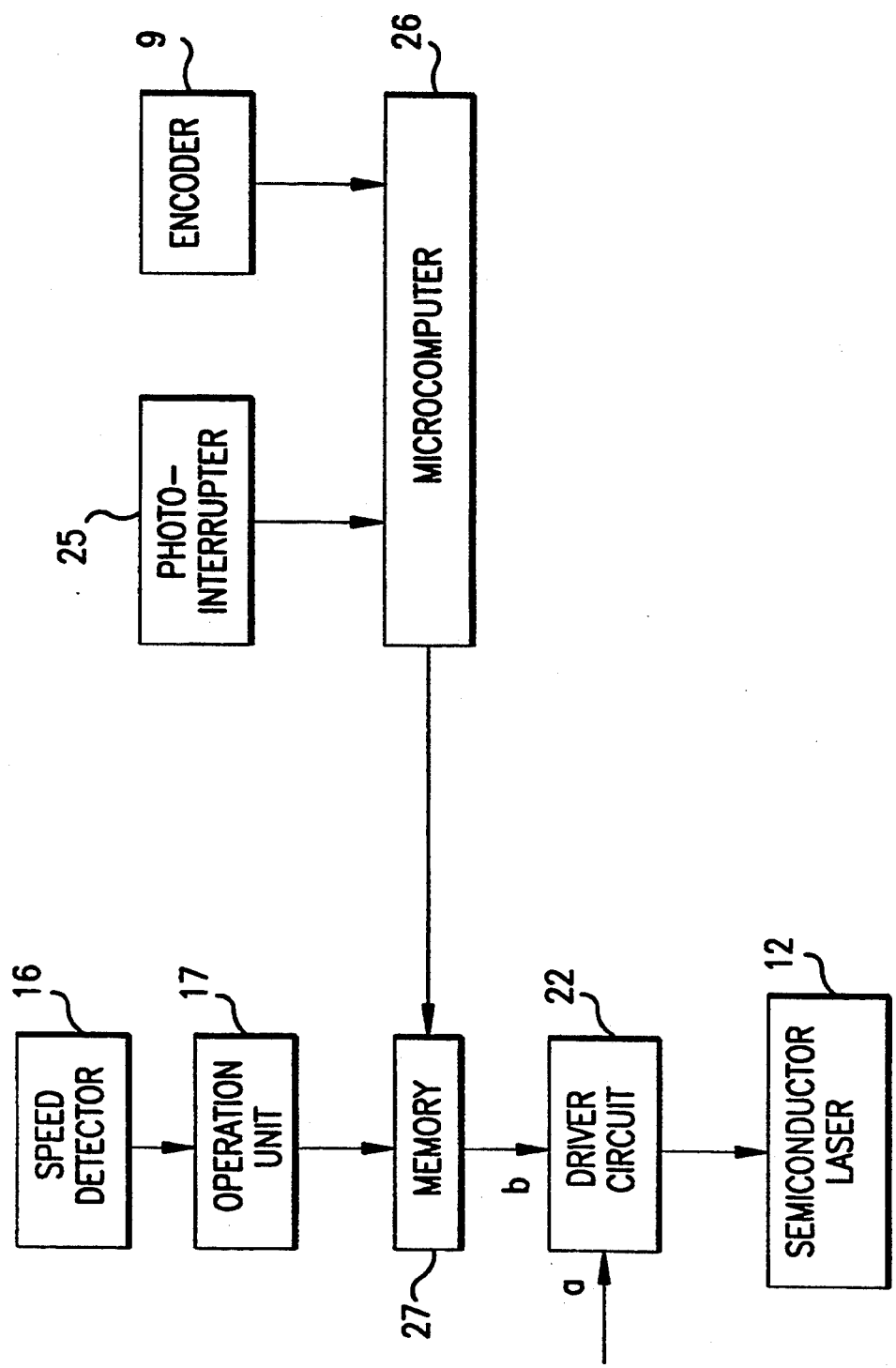
FIG. 11 is a block diagram showing an exposure amount correcting device according to the third embodiment of the present invention.

As shown in FIG. 11, the outputs of the encoder 9 and the photo-interrupter 25 are connected to a microcomputer 26 to supply detection signals thereto. The operation unit 17 produces speed variation data in response to the output from the speed detector 16 as described in the foregoing embodiments. The speed variation data produced from the operation unit 17 are applied to a non-volatile memory 27 for storage. Access to the memory 27 is controlled by the microcomputer 26. The memory 27 is connected to the semiconductor laser driver circuit 22 and the data b read out of the memory 27 are applied to the driver circuit 22. The driver circuit 22 is also applied with image data a and drives the semiconductor laser 12 by supplying total currents corresponding to the data a and b.

The initial setting of the exposure device will be described.

The speed detector 16 is attached to the shaft 11 of the drum 2. In this condition, the drum 2 is rotated by the motor 7 while being subjected to feedback control by the motor drive controller 10. After the rotations of the motor 7 have reached a stable condition, the speed variation data are derived from the speed detector 16 each time when a pulse is generated from the encoder 9, starting from the time when the detection signal is produced from the photo-interrupter 25. Pursuant to an instruction issued from the microcomputer 26, the speed variation data obtained during one rotation of the drum 2 are sequentially written into the memory 27. The addresses of the storage locations in the memory 27 are in one-to-one correspondence to the rotational angles of the drum 2.

After writing of the speed variation data in the memory 27 has been completed, both the speed detector 16 and the operation unit 17 are removed. When the image recording is performed, the microcomputer 26 reads the speed variation data corresponding to the drum rotational angle out of the memory 27 and outputs the data to the semiconductor laser driving circuit 22. The driving circuit 22 drives the semiconductor laser 12 in accordance with the sum of the driving current corresponding to the image data and a correction current corresponding to the speed variation data.

According to the third embodiment, the speed variation data in consecutive circumferential positions of the drum 2 are obtained in the initial setting stage with the use of the speed detector 16 and the operation unit 17. However, once the data are stored in the memory 27, the speed detector 16 and the operation unit 17 are no longer necessary, so they are removed when the image recording apparatus is shipped from a factory.

While in the third embodiment, the speed variation data are stored in the memory 27, a modification may be made so that data corresponding to the total current to be supplied to the semiconductor laser driver 22 are stored in the memory with addresses corresponding to the level of the image data.

A fourth embodiment of the present invention will be described with reference to FIGS. 12 through 15.

As described previously with reference to FIGS. 6, 8 and 9, the image data is superimposed on a threshold current and the resultant current is supplied to the semiconductor laser 12. This is due to the fact that the semiconductor laser 12 does not start oscillating until a current having a level above a threshold value is supplied thereto. Since the oscillation performed by the semiconductor laser 12 is unstable when the current supplied thereto is of a level around the threshold value, and a current vs. laser beam intensity characteristic of the semiconductor laser 12 is non-linear, it is a general practice to flow in the semiconductor laser a current having a level slightly higher than the threshold value and to superimpose the image data thereon.

Figure 6:
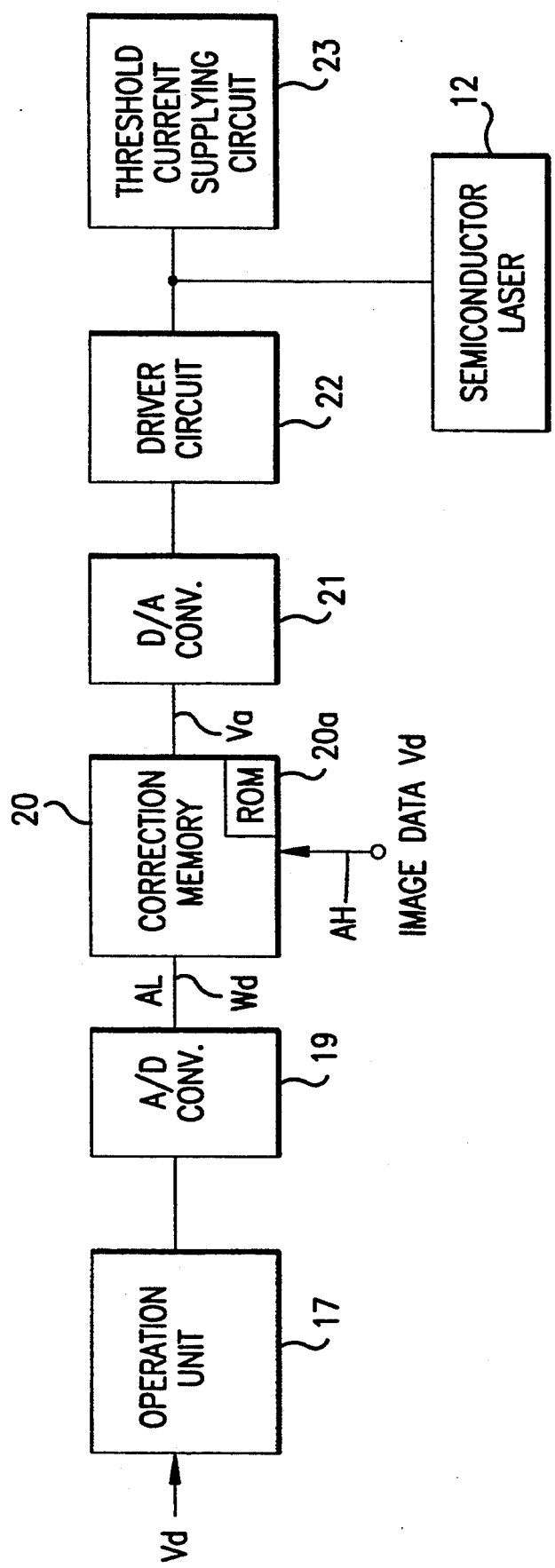
FIG. 6 is a block diagram showing an exposure amount correcting device according to a second embodiment of the present invention.
Figure 12:
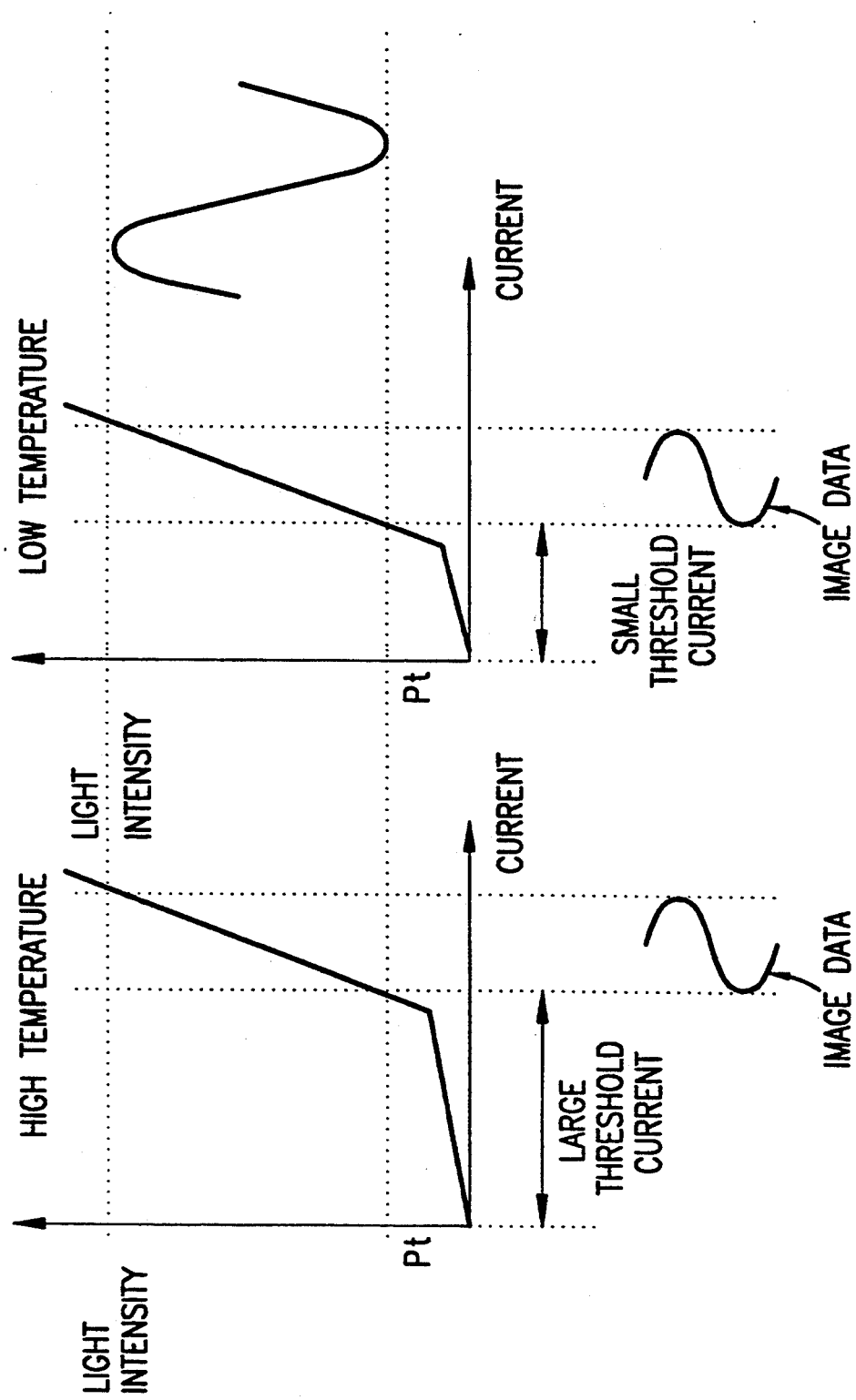
FIG. 12 is a waveform diagram for description of driving of a semiconductor laser.

Representing the laser beam intensity with P0 and the image data with d, the following relationship is met:

$$P0 = \eta \times k \times d + Pt \tag{8}$$

where Pt is the light intensity responsive to the current supplied from the threshold current supplying circuit, $\eta$ is a current-to-light intensity conversion efficiency of the semiconductor laser 12, and k is a signal-to-current conversion efficiency of the driver circuit 22 (see FIG. 6, for example). Even if the level of the threshold current is changed depending on the change of temperature as shown in FIG. 12, the threshold current supplying circuit changes the level of the current to be applied to the semiconductor laser 12 to thereby maintain the light intensity at constant.

Figure 13:
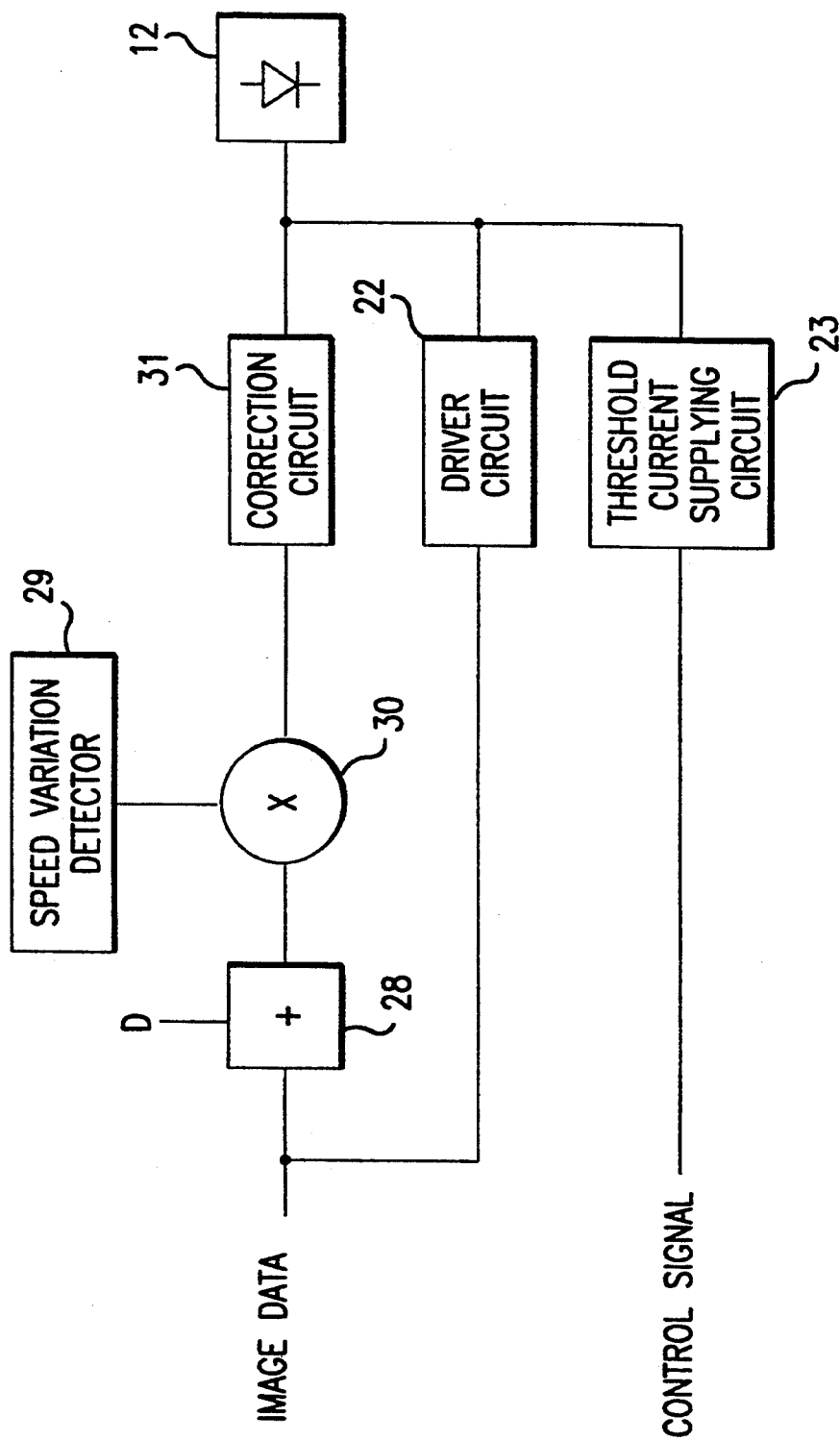
FIG. 13 is a block diagram showing an arrangement of an exposure amount correcting device according to a fourth embodiment of the present invention.

Referring to FIG. 13, the arrangement of the fourth embodiment will be described.

Figure 14:
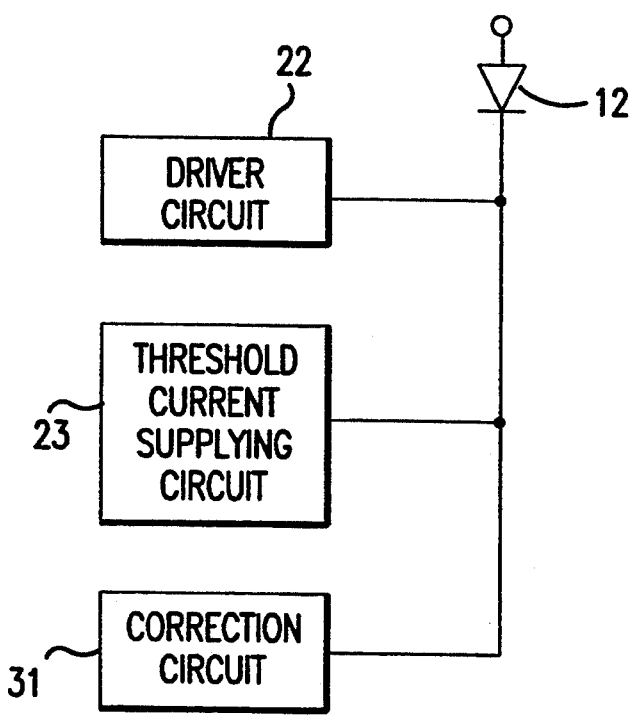
FIG. 14 is a block diagram partially showing a circuit for driving a semiconductor laser.

The semiconductor laser 12 emits a laser beam used for scanning the photosensitive sheet 1 as previously described. The driver circuit 22 receives the image data and supplies a driving current in proportion to the level of the image data to the semiconductor laser 12. The threshold current supplying circuit 23 supplies a current to the semiconductor laser 12. The level of the current supplied from the circuit 23 is slightly larger than that of the threshold current of the semiconductor laser 12. An addition circuit 28 adds a predetermined value D to the image data inputted thereto. A speed variation detector 29 detects the peripheral speed of the drum 2 and outputs a speed variation signal indicative of $\pm \Delta V/V$ on the basis of the detected speed. Here, V is a regular speed at which the drum 2 rotates and $\pm \Delta V$ is the variation in the speed of the drum 2 relative to the speed V. The speed variation signal and the output of the addition circuit 28 are multiplied in a multiplier 30. The resultant signal is applied to a correction circuit 31 where the applied signal is corrected and a correction current is applied to the semiconductor laser 12. To summarize, the currents from the driver circuit 22, the threshold current supplying circuit 23, and the correction circuit 31 are superimposed one on the other and the total amount of current is flowed in the semiconductor laser 12 as shown in FIG. 14.

Figure 15:
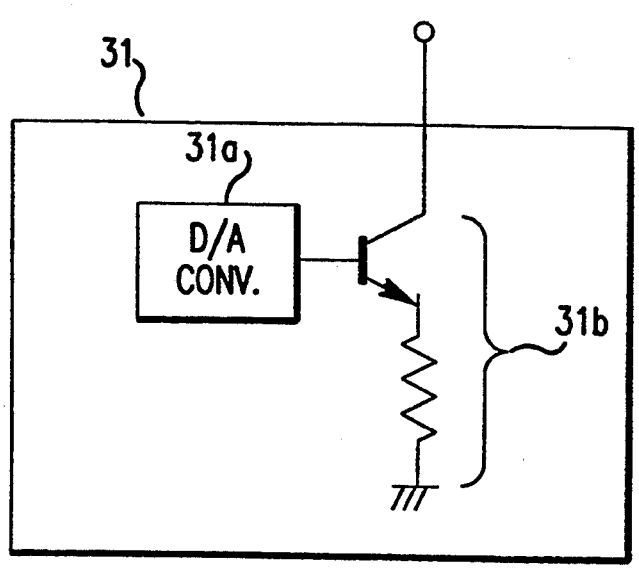
FIG. 15 shows an arrangement of a correction circuit as appeared in the block diagram shown in FIG 13.

Details of the driver circuit 22 and the threshold current supplying circuit 23 are described with reference to FIGS. 8 and 9, respectively. Therefore, no further description thereof is necessary. The correction circuit 31 is constructed as shown in FIG. 15. As shown therein, the correction circuit 31 includes an A-D converter 31a and a current drive circuit 31b. The latter circuit 31b is made up of a transistor having a base connected to the D-A converter 31a, a collector connected to the output of the addition circuit 30, and an emitter connected to one terminal of a resistor. The other terminal of the resistor is grounded.

Figure 16:
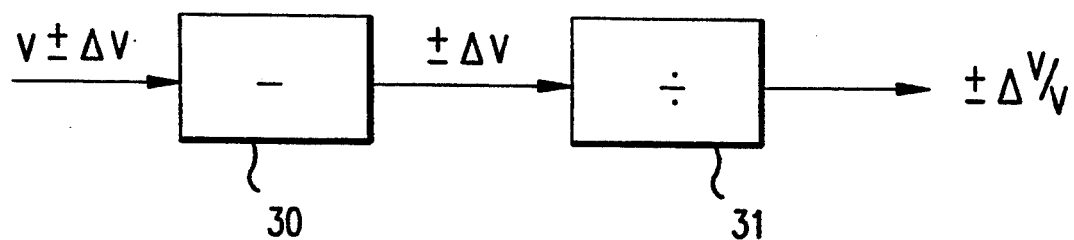
FIG. 16 is a block diagram showing a speed variation detector used in the fourth embodiment of the present invention.

The speed variation detector 29 has an arrangement similar to the speed detector 16 described previously. However, the speed variation detector 29 outputs the speed variation signal indicative of $\pm \Delta V/V$ as mentioned above. More specifically, as shown in FIG. 16, the speed variation detector 29 is made up of a substraction circuit 30 and a division circuit 31. In the substraction circuit 30, the regular speed V is subtracted from the actual rotational speed $V \pm \Delta V$ to thereby give ±ΔV. The output from the substraction circuit 30 is divided by the regular speed V in the division circuit 31, whereby the speed variation signal ±ΔV/V is obtained.

Operation of the fourth embodiment will next be described. In the following description, it is assumed that the laser beam spot has an area S ($m^2$) same as the size of the picture element formed on the photosensitive sheet 1.

When the operation of the image recording apparatus starts, the drum 2 starts rotating at the regular speed V (m/sec). However, the actual rotational or peripheral speed of the drum is V±ΔV (m/sec) containing the variation ±ΔV. The speed variation detector 29 is attached to the shaft 11 of the drum 2 and produces the speed variation signal indicating the actual peripheral speed of the drum 2, i.e., V±ΔV. The image data d are applied to the driver circuit 22. In accordance with the image data d, the driver circuit 22 supplies a corresponding amount of current to the semiconductor laser 12, the semiconductor laser 12 in turn emits a laser beam whose intensity Pa is represented by the following equation:

$$Pa = \eta \times k \times (d+D) \times (\pm \Delta V/V) \text{ (watt)} \quad (9)$$

where k is a signal-to-current conversion efficiency of both the driver circuit 22 and the correction circuit 31 in this instance.

The value D added in the addition circuit 28 is selected so that the following relationship is met.

$$D = \frac{Pt}{\eta \times K} \quad (10)$$

where Pt is the light intensity of the laser beam resulting from the current supplied from the threshold current supplying circuit 23.

The light intensity of the laser beam emitted from the semiconductor laser 12 can be expressed by the following equation:

$$\begin{aligned} P &= Pd + Pt + Pa \quad (11) \\ &= \eta \times k \times \left(d + \frac{Pt}{\eta \times k}\right) \times \left(1 \pm \frac{\Delta V}{V}\right) \\ &= (Pd + Pt) \times \left(1 \pm \frac{\Delta V}{V}\right) \text{(watt)} \end{aligned}$$

The laser beam whose intensity is expressed by equation (11) is irradiated onto the precharged photosensitive sheet 1 for exposure, thereby forming a latent image thereon.

The exposure amount E which each picture element on the photosensitive sheet 1 receives is defined by a product of the laser beam intensity and an exposure time. Therefore, the following equation is obtained:

$$\begin{aligned} E &= \frac{(Pd + Pt) \times (1 \pm \Delta V/V)}{(V \pm \Delta V) \times L} \quad (12) \\ &= \frac{Pd + Pt}{V \times L} \text{ (Joule/}m^2\text{)} \end{aligned}$$

As can be appreciated from equation (12), the exposure amount E is not affected by the speed variation ±ΔV.

Figure 17:
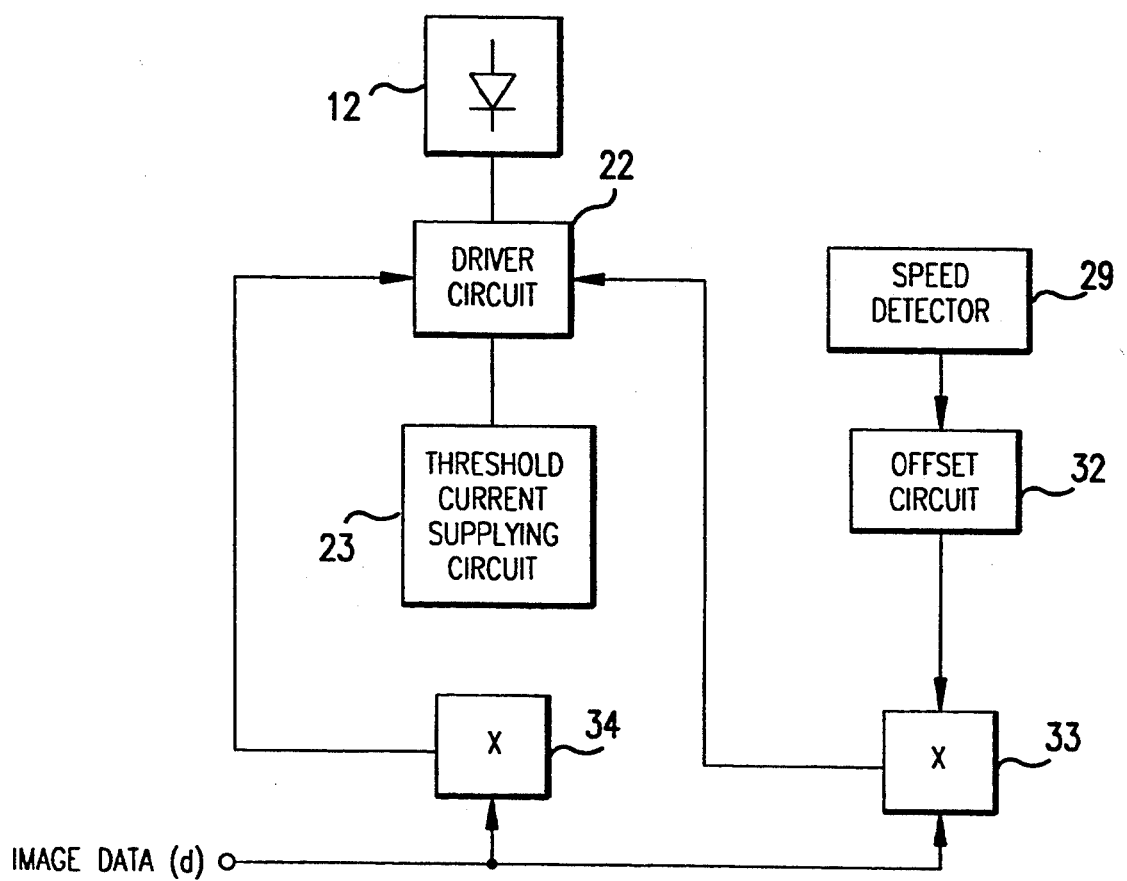
FIG. 17 is a block diagram showing an arrangement of an exposure amount correcting device according to a fifth embodiment of the present invention.

A fifth embodiment of the present invention will be described with reference to FIG. 17.

In the arrangement shown therein, the speed detector 29 is arranged as shown in FIG. 16 and outputs the speed variation data ±ΔV/V. An offset circuit 32 is connected to the output of the speed detector 16, which adds an offset value, e.g. 0.01, to the speed variation data and outputs offset speed variation data. A first multiplier circuit 33 connected to the output of the offset circuit 32 is supplied with the image data, in which the image data and the offset speed variation data are multiplied and the resultant data referred to as "speed variation corrected data" are outputted therefrom and applied to the driver circuit 22. The threshold current supplying circuit 23 also supplies threshold data to the driver circuit 22. A second multiplier circuit 34 is also supplied with the image data, in which a value obtained by subtracting the offset value from one (1), i.e. 0.99 in the case where the offset value is 0.01, is multiplied to the image data and outputs data referred to as "corrected image data" to the driver circuit 22. Thus, the driver circuit 22 drives the semiconductor laser 12 in accordance with a sum of the speed variation corrected data, the threshold data, and the corrected image data.

In operation, the offset circuit 32 adds the offset value 0.01 to the speed variation data ±ΔV/V and outputs the offset speed variation data 0.01±ΔV/V. It should be noted that the absolute value of the speed variation data ±ΔV/V is sufficiently small as compared with the offset value 0.01. Therefore, the offset speed variation data always take a positive value.

The first multiplier circuit 33 multiplies the offset speed variation data 0.01±ΔV/V and the image data d and outputs the speed variation corrected image data represented by the following equation:

$$(0.01 \pm \Delta V/V) \times d \quad (13)$$

In the second multiplier circuit 34, the image data d and (1 minus offset value=0.99) are multiplied and the corrected image data (0.99×d) are outputted to the driver circuit 22. The driver circuit 22 converts the corrected image data, threshold data, and the speed variation corrected image data into the respective levels of currents which are applied to the semiconductor laser 12. The current I applied to the semiconductor laser 12 is represented by the following equation:

$$\begin{aligned} I &= k \times \{0.99 \times d + Th + (0.01 \pm \Delta V/V) \times d)\} \quad (14) \\ &= k \times \{Th + (1 \pm \Delta V/V) \times d)\} \end{aligned}$$

Since the current given by k×Th is equal to the threshold current, the light intensity P of the laser beam is represented by the following equation:

$$P = \eta \times k \times (1 \pm \Delta V/V) \times d \quad (15)$$

The exposure amount E received at each picture element is given by a product of the intensity of the laser beam and the exposure time, thus the following equation is obtained:

$$\begin{aligned} E &= \eta \times k \times (1 \pm \Delta V/V) \times d \times \quad (16) \\ &\quad [1/\{L \times (V \pm \Delta V)\}] \\ &= \eta \times k \times d \times \{1/(L \times V)\} \end{aligned}$$

Therefore, the exposure amount E is not affected by the speed variation ±ΔV, that is, the exposure can be accomplished without being affected by the speed variation ±ΔV.

In the above description, although the offset value 0.01 has been exemplified, other values are of course available.

While the present invention has been described with reference to specific embodiments, it can be understood by a person skilled in the art that a variety of changes and modifications may be made without departing from the scope and spirit of the invention. For example, in lieu of using the photosensitive sheet wound ground the drum, a photosensitive drum may be used. Further, an endless belt circulation mechanism adapted to carry a sheet-like photosensitive sheet may be used in lieu of the rotary drum.

The formation of the latent image may be performed according to an area gradation by way of, for example, a pulse width modulation, although it has been described that the formation of the latent image is performed according to a change of intensity of the laser beam.

What is claimed is:

1. An exposure device for forming a latent image on a photosensitive recording member, comprising:
   image data generating means for generating image data having a level;
   moving means for moving the recording member at a regular speed which is subject to variation;
   speed variation detecting means for detecting a variation of the speed at which the recording member is moved, and for producing speed variation data having a level indicative of the variation in the speed of the recording member;
   a semiconductor laser, having an input to which a signal having a level is applied, for emitting a laser beam onto the recording member, an intensity of the laser beam being variable dependent on the level of the signal applied to the input of said semiconductor laser; and
   correction means for correcting the intensity of the laser beam in accordance with the speed variation data, said correction means comprising storage means for storing groups of data, wherein said correction means:
   1) applies the image data to one of the groups of data and applies the speed variation data to another of the groups of data to produce corrected image data; and
   2) outputs the corrected image data for application to the input of said semiconductor laser.

2. The exposure device according to claim 1, wherein said speed variation detecting means comprises speed detecting means for detecting the moving speed of the recording member and outputting data indicative of the detected moving speed of the recording member, and operation means for dividing the data outputted from said speed detecting means by a predetermined value corresponding to the regular speed, thereby giving the speed variation data.

3. The exposure device according to claim 2, wherein said correction means comprises a multiplier which multiplies the level of the image data and the level of the speed variation data.

4. An exposure device for forming a latent image on a photosensitive recording member, comprising:
   image data generating means for generating image data having a level;
   semiconductor laser for emitting a laser beam onto the recording member;
   moving means for moving the recording member at a regular speed, the speed at which the recording member is moved being liable to vary from the regular speed;
   speed variation detecting means for detecting a variation of the speed at which the recording member is moved, and for producing speed variation data having a level indicative of the variation in the speed of the recording member;
   offset means for adding a predetermined offset value to the speed variation data and producing added data;
   first multiplying means for multiplying the added data and the image data and producing a first multiplied data, the first multiplied data being one of positive and negative in polarity;
   second multiplying means for multiplying a value obtained by reducing the offset value from one and the image data and producing a second multiplied data; and
   applying means for applying the first multiplied data and the second multiplied data to said semiconductor laser.

5. The exposure device according to claim 2, wherein said correction means comprises storage means for storing the speed variation data in relationship to positions of the recording member, and further comprising position identifying means for identifying positions of the photosensitive member and producing position data indicative of the positions of the photosensitive member, and timing means for sequentially reading the data stored in said storage means in accordance with the position data.

6. The exposure device according to claim 5, wherein said semiconductor laser emits the laser beam in accordance with data read out from said storage means and the level of the image data.

7. The exposure device according to claim 5, wherein said position identifying means is connected to said moving means.

8. The exposure device according to claim 5, wherein said timing means comprises reference position detecting means for detecting a reference position on the recording member.

9. The exposure device according to claim 5, wherein the photosensitive recording member is in the form of a drum, the drum being rotatable together with a shaft secured thereto, and wherein said speed variation detecting means is removably attached to the shaft of the drum.

10. The exposure device according to claim 2, wherein said correction means comprises storage means for storing data used for driving said semiconductor laser, the data stored in said storage means containing the relationship of the speed variation data to positions of the recording member and the level of the image data, and further comprising timing means for sequentially reading the data stored in said storage means in accordance with positions of the recording member and the level of the image data.

11. The exposure device according to claim 10, wherein position identifying means is connected to said moving means.

12. The exposure device according to claim 10, wherein said timing means comprises reference position detecting means for detecting a reference position on the recording member.

13. The exposure device according to claim 10, wherein the photosensitive recording member is in the form of a drum, the drum being rotatable together with a shaft secured thereto, and wherein said speed variation detecting means is removably attached to the shaft of the drum.

14. An exposure device for forming a latent image on a photosensitive recording member, comprising:

image data generating means for generating image data having a level;

semiconductor laser for emitting a laser beam onto the recording member, said semiconductor laser emitting the laser beam when a current supplied thereto has a level higher than a threshold value;

first current supplying means for supplying a first current corresponding to the level of the image data to said semiconductor laser;

second current supplying means for supplying a second current whose level is slightly higher than the threshold value to said semiconductor laser;

addition means for adding a predetermined value to the image data and producing added data;

moving means for moving the recording member at a regular speed, the speed at which the recording member is moved being liable to vary from the regular speed;

speed variation detecting means for detecting a variation of the speed at which the recording member is moved, and for producing speed variation data having a level indicative of the variation in the speed of the recording member relative to the regular speed;

multiplying means for multiplying the added data and the speed variation data and producing multiplied data; and correction means for applying a current to said semiconductor laser to correct the intensity of the laser beam in accordance with the multiplied data.

15. The exposure device according to claim 14, wherein the photosensitive recording member is in the form of a drum, the drum being rotatable together with a shaft secured thereto.

* * * * *